United States Patent
Chen

[11] Patent Number: 5,669,477
[45] Date of Patent: Sep. 23, 1997

[54] FREE-WHEEL HUB TRANSMISSION MECHANISM OF A BICYCLE

[76] Inventor: Kun-Teng Chen, No.269, Sec.3, Min Sheng Road, Taya Hsiang, Taichung Hsien, Taiwan

[21] Appl. No.: 595,377

[22] Filed: Feb. 1, 1996

[51] Int. Cl.$^6$ ................................ F16D 41/24
[52] U.S. Cl. ........................... 192/64; 192/415
[58] Field of Search ........................ 192/64, 415

[56] References Cited

U.S. PATENT DOCUMENTS

| | | | |
|---|---|---|---|
| 2,246,191 | 6/1941 | Schmitz | 192/64 |
| 4,671,396 | 6/1987 | Kotamaki | 192/64 X |
| 4,858,494 | 8/1989 | Healy | 192/64 X |

*Primary Examiner*—Andrea L. Pitts
*Attorney, Agent, or Firm*—Connolly & Hutz

[57] ABSTRACT

A free-wheel hub transmission mechanism which includes a threaded axle coupled to the seat stays of a bicycle, a hub barrel fastened to the free-wheel spokes of the bicycle and disposed around the threaded axle, a driving barrel sleeved onto the threaded axle and having one end inserted into the hub barrel and an opposite end fastened to the free-sprocket of the bicycle, a coupling socket mounted within the hub barrel around the threaded axle, a conical spring mounted within the hub barrel around the coupling socket, a conical bushing and a cup mounted within the hub barrel to stop the conical spring inside the hub barrel, a plurality of ball bearings mounted around the threaded axle, and two lock nuts respectively threaded onto two opposite ends of the threaded axle, wherein the coupling socket is forced forwards into engagement with an inside annular flange of the hub barrel, causing the threaded axle and the hub barrel to be turned with the driving barrel when the driving barrel is rotated clockwise by the free-sprocket of the bicycle; the coupling socket is disengaged from the inside annular flange of the hub barrel, causing the driving barrel to run idle when the free-sprocket of the bicycle is rotated counter-clockwise.

1 Claim, 4 Drawing Sheets

FREE-WHEEL HUB TRANSMISSION MECHANISM OF A BICYCLE

BACKGROUND OF THE INVENTION

The present invention relates to bicycles, and relates more particularly to the free-wheel hub transmission mechanism of a bicycle which produces little noise when the free-sprocket is rotated counter-clockwise.

Bicycles are nowadays popularily accepted by people of all ages, and used as short distance personal transportation vehicles as well as sport game implements. The free-wheel of a bicycle is driven by a chain drive through a free-sprocket. The free-sprocket is coupled to the free-wheel by a connector with a tooth. When the free-sprocket is rotated clockwise, the tooth of the connector is forced into engagement with the teeth of the free-sprocket, and therefore the connector with the free-wheel hub and the free-wheel are turned in the same direction. When the free-sprocket is rotated counter-clockwise, the teeth of the free-sprocket are moved over the tooth of the connector, therefore the connector does no work. However, because the teeth of the free-sprocket are moved over the tooth of the connector during the idle running of the free-sprocket, a big noise is produced.

SUMMARY OF THE INVENTION

The present invention has been accomplished to provide a free-wheel hub transmission mechanism which eliminates the aforesaid problem. According to the preferred embodiment of the present invention, the free-wheel hub transmission mechanism comprising a threaded axle coupled to the seat stays of a bicycle, a hub barrel fastened to the free-wheel spokes of the bicycle and disposed around the threaded axle, a driving barrel sleeved onto the threaded axle and having one end inserted into the hub barrel and an opposite end fastened to the free-sprocket of the bicycle, a coupling socket mounted within the hub barrel around the threaded axle, a conical spring mounted within the hub barrel around the coupling socket, a conical bushing and a cup mounted within the hub barrel to stop the coil spring inside the hub barrel, a plurality of ball bearings mounted around the threaded axle, and two lock nuts respectively threaded onto two opposite ends of the threaded axle, wherein the driving barrel is shaped like a T-shaped tube having a longitudinal center through hole, a hollow threaded body inserted into the hub barrel, a hollow threaded head connected to one end of the threaded body and fastened to the free-sprocket of the bicycle, the threaded head defining a bearing seat, which holds one ball bearing around the threaded axle; the hub barrel comprises a first bearing seat at a front end thereof, which holds one ball bearing around the threaded body of the driving barrel, a second bearing seat at a rear end thereof, which holds on ball bearing around one lock nut, and an inside annular flange disposed adjacent to the first bearing seat of the hub barrel around the threaded body of the driving barrel; the coupling socket comprises a front section of bigger diameter, a rear section of smaller diameter, and an inner thread raised around the inside of the front section and threaded onto the threaded body of the driving barrel; the coil spring is mounted around the rear section of the coupling socket and stopped inside the hub barrel by the cup; the coupling socket is forced forwards into engagement with the inside annular flange of the hub barrel, causing the threaded axle and the hub barrel to be turned with the driving barrel when the driving barrel is rotated clockwise by the free-sprocket of the bicycle; the coupling socket is disengaged from the inside annular flange of the hub barrel, causing the driving barrel to run idle when the free-sprocket of the bicycle is rotated counter-clockwise.

DETAILED DESCRIPTION OF THE PREFERRED EMBODIMENT

Figure 1:
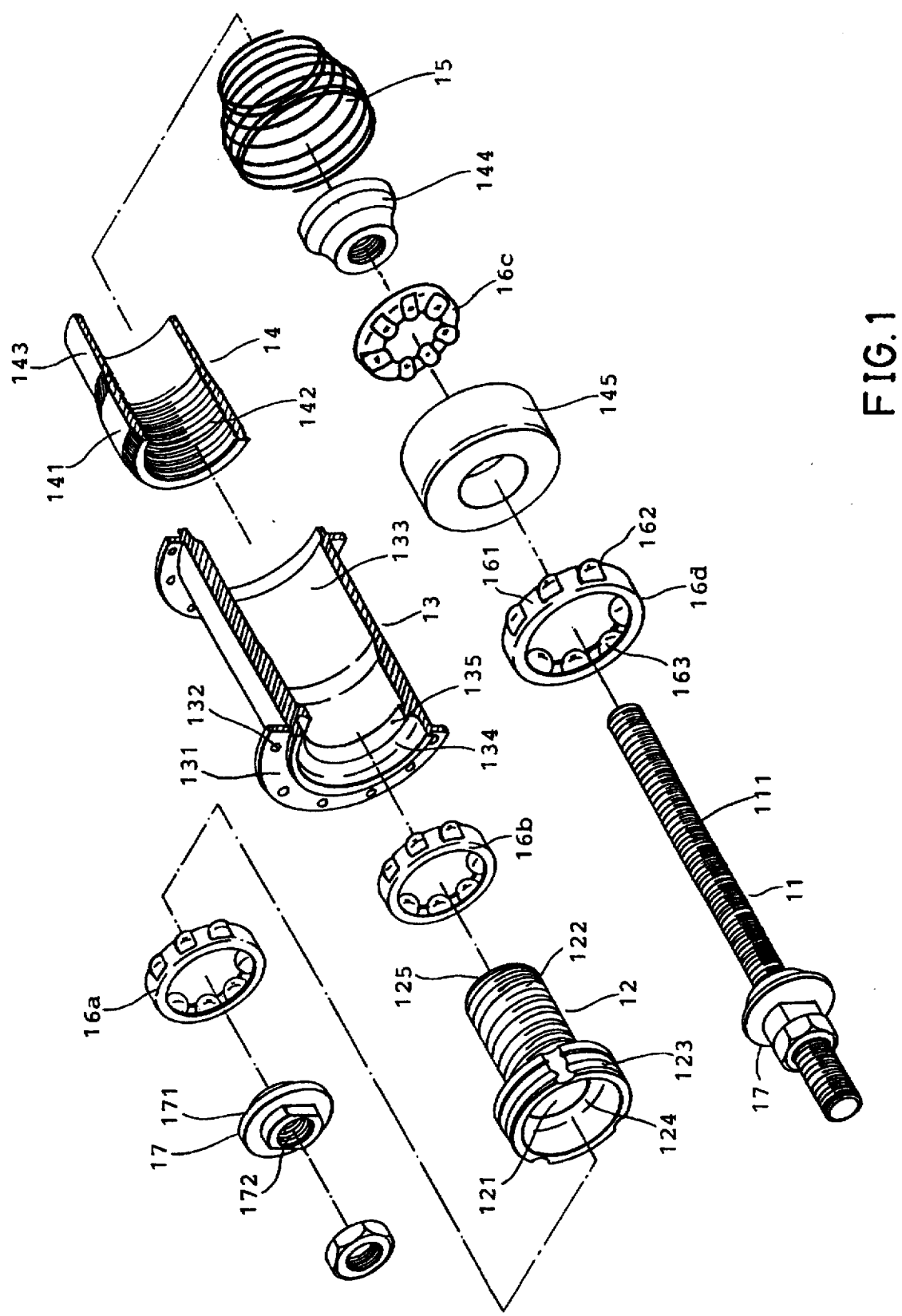
FIG. 1 is an exploded view of a free-wheel hub transmission mechanism according to the present invention.

Referring to FIG. 1, the free-wheel hub transmission mechanism, referenced by 10, comprises an axle 11, a driving barrel 12, a hub barrel 13, a coupling socket 14, a spring 15, ball bearings 16, and lock nuts 17. The axle 11 has an outer thread 111 around the periphery. When the axle 11 is inserted through the driving barrel 12, the coupling socket 14, the spring 15, and the ball bearings 16, two lock nuts 17 are respectively fastened to two opposite ends of the axle 11, and then the free-wheel hub transmission mechanism 10 is fastened to the seat stays (not shown) at the bottom and coupled to the free-wheel (not shown). The hub barrel 13 holds the driving barrel 12, the coupling socket 14, the spring 15, and the ball bearings 16 on the inside, having two outward flanges 131 raised around two opposite ends thereof. Each of the outward flanges 131 has a plurality of equiangularly spaced round holes 132 for the installation of the spokes of the free-wheel of the bicycle (not shown). The ball bearings 16 include a first ball bearing 16a, a second ball bearing 16b, a third ball bearing 16c, and a fourth ball bearing 16d. Each of the ball bearings 16 comprises a ball housing 161 having a plurality of equiangularly spaced ball seats 162 on the inside, and a plurality of balls 163 revolvably and respectively mounted in the ball seats 162. Each of the lock nuts 17 has an outward flange 171 raised around the periphery in the middle, and a screw hole 172 at the center. The spring 15 is a coil spring.

Figure 2:
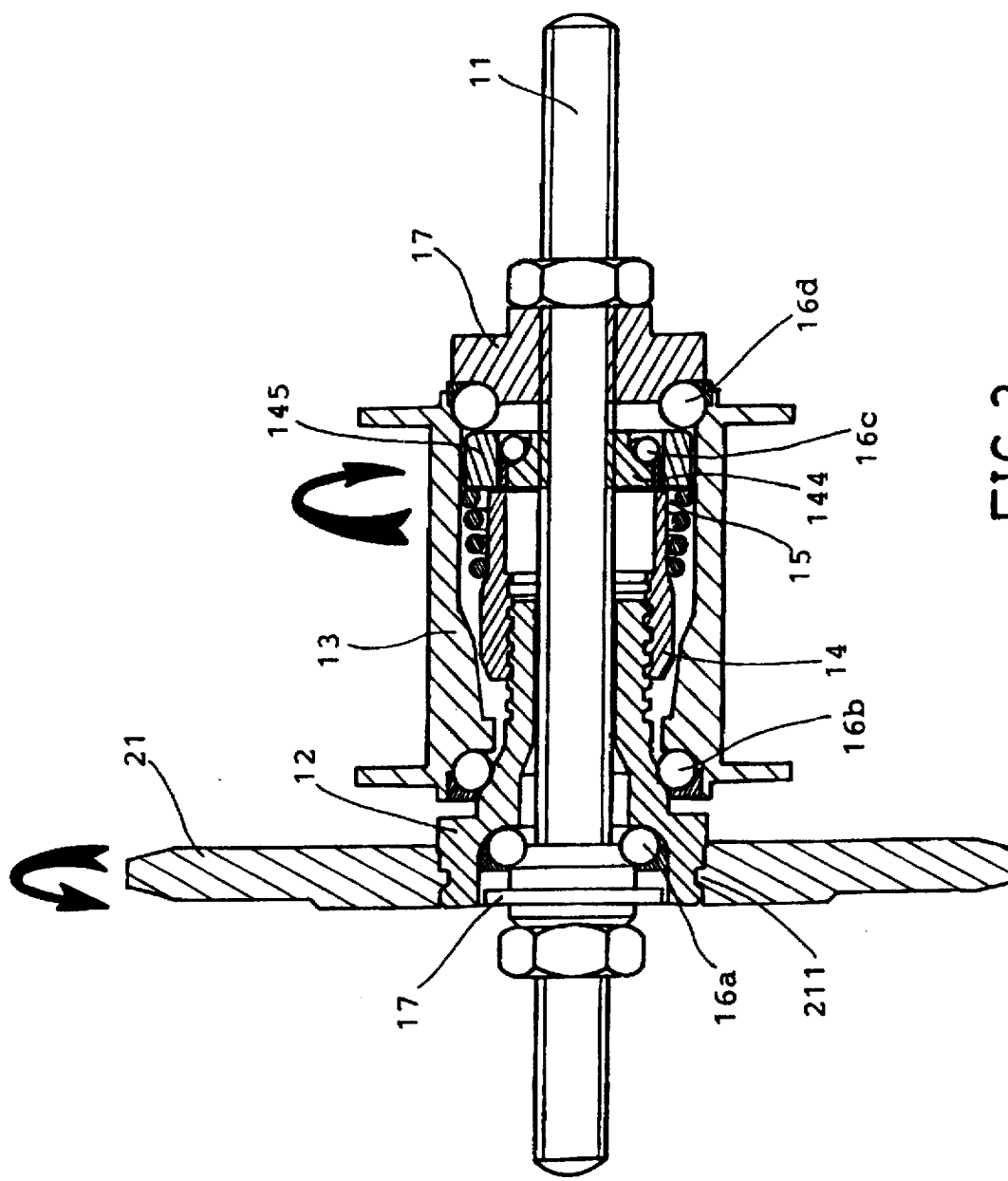
FIG. 2 is a sectional view of the free-wheel hub transmission mechanism shown in FIG. 1, showing the coupling socket disengaged from the inside annular flange of the hub barrel.
Figure 4:
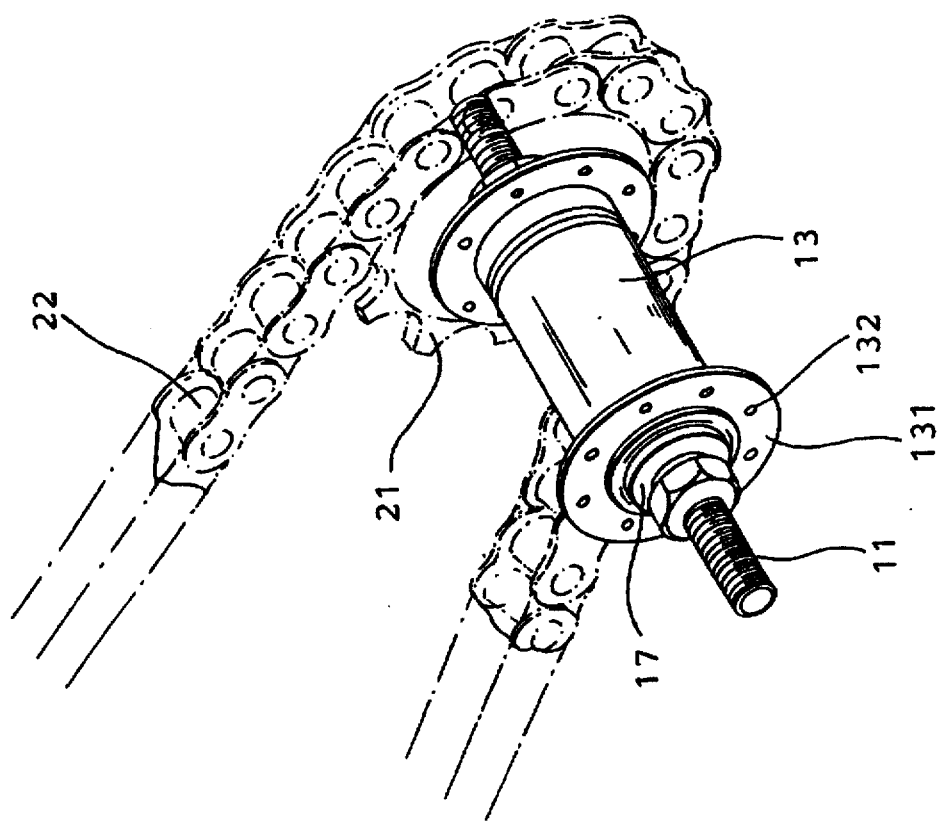
FIG. 4 is an elevational view of the present invention, showing the free-wheel hub transmission mechanism installed in the free-sprocket and the free-sprocket coupled to the chain.

The driving barrel 12 is shaped like a T-shaped tube having a longitudinal center through hole 121, a hollow threaded body 122, a hollow threaded head 123 at one end of the body 122 for threading into the center screw hole 211 of the free-sprocket 21 (see FIG. 2). The free-sprocket 21 is driven by a chain 22 (see FIG. 4). The threaded head 123 of the driving barrel 12 defines a bearing seat (124) on the inside, which holds the first ball bearing 16a. The rear end 125 of the theaded body 12 is inserted through the second ball bearing 16b, then into the longitudinal center through hole 133 of the hub barrel 13.

The hub barrel 13 comprises two bearing seats 134 inside the longitudinal center through hole 133 near two opposite ends for holding the second ball bearing 16b and the fourth ball bearing 16d, and an inside annular flange 135 raised around the longitudinal center through hole 133 and disposed adjacent to one bearing seat 134. The inner diameter of the inside annular flange 135 is slightly bigger than the outer diameter of the threaded body 122 of the driving barrel 12. The diameter of the longitudinal center through hole 133 of the hub barrel 13 gradually increases toward the rear end (away from the inside annular flange 135) for holding the conical spring 15 (see FIGS. 2 and 3).

The coupling socket 14 is inserted into the longitudinal center through hole 133 of the hub barrel 13 comprising a front section 141 of bigger diameter, a rear section 143 of smaller diameter, and an inner thread 142 around the inside wall of the front section 141. When the coupling socket 14 is inserted into the longitudinal center through hole 133 of the hub barrel 13, the inner thread 142 is threaded onto the threaded body 122 of the driving barrel 12. After the installation of the coupling socket 14, the conical spring 15 is mounted within the longitudinal center through hole 133 of the hub barrel 13 and sleeved onto the rear section 143 of the coupling socket 14, then a conical bushing 144, the third ball bearing 16c, and a cup 145 are respectively mounted in the longitudinal center through hole 133 of the hub barrel 13 around the axle 11 and secured in place by the respective lock nut 17 to stop the coupling socket 14 and the coil spring 15 on the inside.

Figure 3:
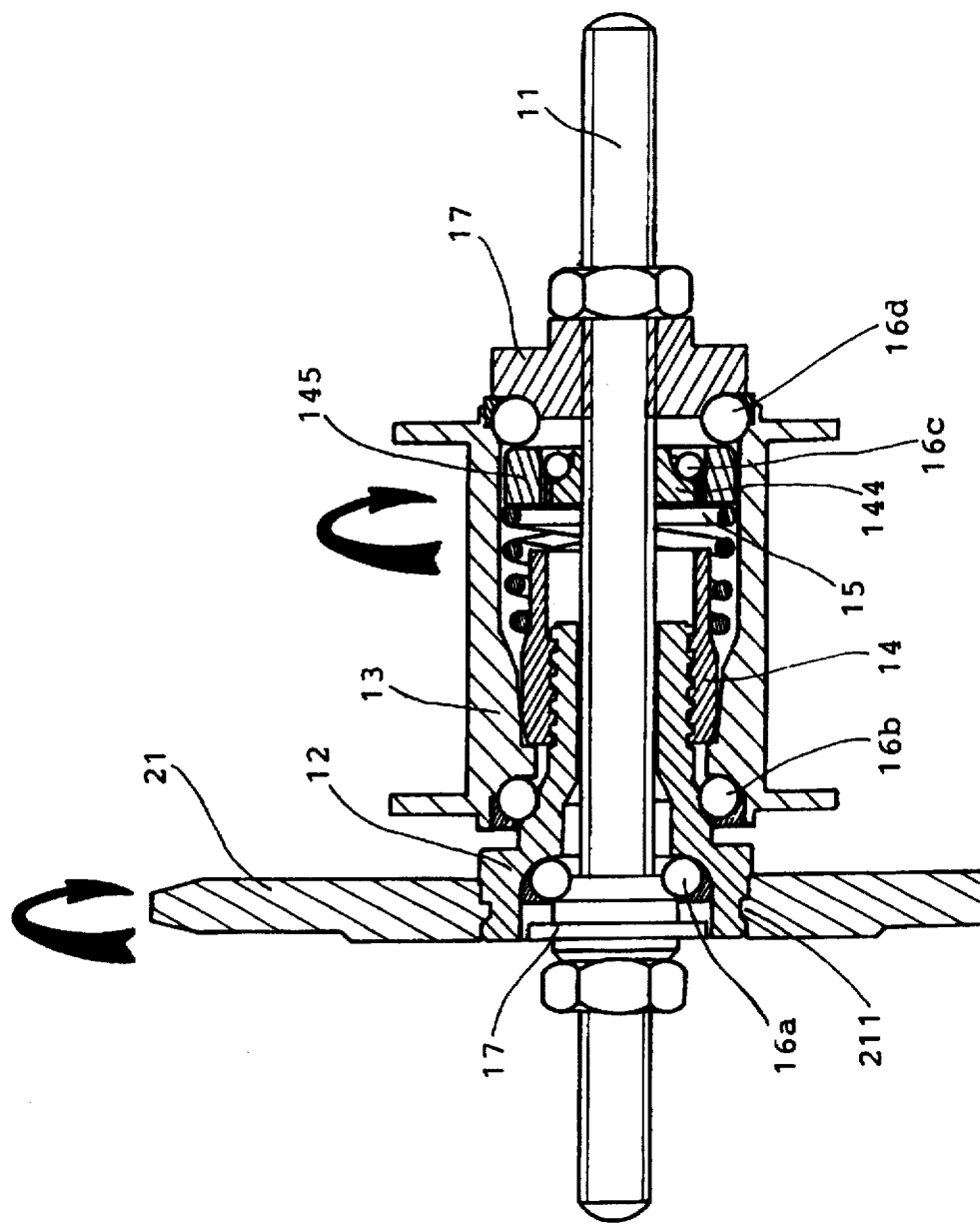
FIG. 3 is another sectional view of the free-wheel hub transmission mechanism shown in FIG. 1, showing the coupling socket forced into engagement with the inside annular flange of the hub barrel.

Referring to FIGS. 2 and 3, the rear end 125 of the threaded body 122 of the driving barrel 12 is threaded into the inner thread 142 of the front section 141 of the coupling socket 14; the rear section 143 of the coupling socket 14 is inserted through the coil spring 15, the third ball bearing 16c, the conical bushing 144, and the cup 145; the second ball bearing 16b and the fourth ball bearing 16d are respectively mounted in the bearing seats 134 of the hub barrel 13; the first ball bearing 16a is mounted in the bearing seat 124 of the driving barrel 12; the axle 11 is inserted through the longitudinal center through hole 121 of the driving barrel 12, the coupling socket 14, the conical bushing 144, the third ball bearing 16c, the cup 145, the fourth ball bearing 16d, and then screwed up with the lock nuts 17 at two opposite ends. When installed, the outward flanges 171 of the lock nuts 17 are respectively stopped against the first ball bearing 16a and the fourth ball bearing 16d.

When the free-sprocket 21 is rotated clockwise, the driving barrel 12 is synchronuously turned, causing the coupling socket 14 to move forwards toward the inside annular flange 135 of the hub barrel 13. When the coupling socket 14 is moved into engagement with the inside annular flange 135, the coil spring 15 is forced against the fourth ball bearing 16d, therefore the free-sprocket 21 is coupled to the axle 11, causing the axle 11 to be turned with the hub barrel 13 (see FIG. 2).

When the free-sprocket 21 is rotated counter-clockwise, the driving barrel 12 is turned synchronuously without causing the coupling socket 14 to move forward, therefore the coupling socket 14 is disengaged from the inside annular flange 135 of the hub barrel 13. During the idle running of the driving barrel 12, the free-wheel of the bicycle is maintained immovable or turning in its original direction (clockwise). Because the free-wheel of the bicycle is disconnected from the free-sprocket 21 during the idle running of the driving barrel 12, no noise is produced.

While only one embodiment of the present invention has been shown and described, it will be understood that various modifications and changes could be made without departing from the spirit and scope of the invention disclosed.

What the invention claimed is:

1. A free-wheel hub transmission mechanism, comprising
   a threaded axle;
   a hub barrel, an end part of said hub barrel having an inside annular flange, an inner diameter of said hub barrel gradually increasing from said inside annular flange to the other end;
   a driving barrel, said driving barrel having a hollow threaded body with a hollow threaded head of bigger diameter for placing around said axle, said hollow threaded body being received in said hub barrel, a part of said hollow threaded body adjoining said hollow threaded head being fitted to an end of said hub barrel near said inside annular flange with a ball bearing;
   a lock nut, said lock nut being engaged with the axle and being received in the driving barrel to press against an inner wall of said hollow head adjacent to said hollow body with another ball bearing;
   a sprocket with an internal thread, said sprocket being secured to the threaded head on said driving hub;
   a movable coupling socket with an end section of bigger outer diameter, said end section having an internal thread to engage wit the driving barrel in the hub barrel;
   a conical bushing, said conical bushing having a central threaded hole to engage with the axle and being located at the other end of said hub barrel;
   an annular cup, said cup enclosing said conical bushing and being fitted to said conical bushing with a further ball bearing;
   a coil spring, said coil spring being placed around the coupling socket, an end of said coil spring pressing against an edge of aid end section on the coupling socket, the other end of said coil spring pressing against said cup; and
   a further lock nut, said further lock nut being engaged with the axle and pressing against said cup with a still further ball bearing at the other end of said hub barrel;
   whereby, when said sprocket turns said driving barrel to rotate clockwise, said coupling socket moves toward said inside annular flange in said hub barrel so that said inside annular flange is pressed by said coupling socket to result in said hub barrel and said axle synchronously rotating clockwise either; when said sprocket turns said driving barrel to rotate counterclockwise, said coupling socket moves far from said inside annular flange so that said hub barrel and said axle are unable to rotate synchronously with said driving barrel counterclockwise.

* * * * *